United States Patent [19]
Burner

[11] Patent Number: 5,295,167
[45] Date of Patent: Mar. 15, 1994

[54] SERVICE POLE CADDY SYSTEM

[75] Inventor: James E. Burner, Downingtown, Pa.

[73] Assignee: General Electric Company, San Jose, Calif.

[21] Appl. No.: 18,141

[22] Filed: Feb. 16, 1993

[51] Int. Cl.$^5$ .............................................. G21C 19/00
[52] U.S. Cl. ..................................................... 376/260
[58] Field of Search ........................... 376/260, 261, 271

[56] References Cited

U.S. PATENT DOCUMENTS

| | | | |
|---|---|---|---|
| 5,028,379 | 7/1991 | Faulstich | 376/248 |
| 5,084,231 | 1/1992 | Dixon et al. | 376/271 |
| 5,085,824 | 2/1992 | Busch et al. | 376/268 |
| 5,098,644 | 3/1992 | McDaniels | 376/261 |

OTHER PUBLICATIONS

"ABB Rigid Pole Handling System" brochure, 1992, Combustion Engineering, Inc.

Primary Examiner—Daniel D. Wasil
Attorney, Agent, or Firm—J. S. Beulick

[57] ABSTRACT

A pole storage caddy system includes a pole storage caddy for storing a set of service poles, a pole assembly work station, a motorized monorail pole hoist and a detachable auxiliary personnel work platform, all mounted on a rail truck-mounted rigid frame. The hoist is used to convey the pole sections between the storage caddy and work station during assembly and to support the weight of the pole assembly for in-vessel work. The pole assembly work station includes a two-position slotted keyway plate, the first position providing lateral restraint during torquing operations and the second position providing vertical support during pole assembly.

19 Claims, 10 Drawing Sheets

SERVICE POLE CADDY SYSTEM

FIELD OF THE INVENTION

This invention generally relates to an apparatus which is supported by and transportable along a refueling bridge of a nuclear reactor. In particular, the invention is directed to an apparatus for storing and coupling extension poles used to manipulate a tool at a remote location inside a boiling water reactor and supporting the coupled poles during assembly, transport and manipulation of the tool.

BACKGROUND OF THE INVENTION

During disassembly and servicing of a boiling water reactor, some activities must be performed underwater at depths of 40 to 60 feet. These activities are typically performed from the refueling bridge which spans the reactor cavity. Hollow, thin-walled poles are frequently used to reach the reactor components. These poles (each about 10 feet long and 2 to 4 inches in diameter) are usually stored on the refueling bridge. In order to reach the desired depth underwater, a number of poles are connected in series until the total length of the assembly is sufficient to allow one end of the assembly to be manipulated while the other end supports the tool at the desired depth. These poles are conventionally assembled on the bridge. Different diameter poles are used, with the larger-diameter poles being for high-torque activities. This system for storing, assembling and manipulating service poles on a refueling bridge suffers from a number of disadvantages.

First, in order to reach the desired depth underwater, a number of poles need to be available to be coupled. The poles are usually stored by laying them down on the refueling bridge walkway prior to assembly and after disassembly. Poles stored in this way can obstruct other activities, present a hazard to personnel walking on the bridge, become tangled with ropes and lines, and spread contamination on the refueling bridge.

Second, small-diameter, lightweight poles, which are typically used for underwater work, are very flexible and difficult to position when connected in long assemblies. Also, they cannot transmit the significant amount of torque which is required for some tools and operations. The poles also become very contaminated on the inside and are difficult to clean.

Third, assembly and disassembly of a multiple-pole assembly requires much handling and holding of the pole sections. Holding and handling the weight of the pole assembly is tiring for operating personnel. During assembly or disassembly of the poles, it is possible for a pole to slip out of the operator's hands and into the cavity.

Fourth, when using poles for a torquing operation, either a T-bar or a second person is required to hold the pole steady.

Lastly, some underwater servicing operations require three or more people working along side each other in close proximity on the refueling bridge walkway. The close proximity of the workers causes congested working conditions and reduces individual visual observation of the underwater work.

SUMMARY OF THE INVENTION

The present invention is a service pole caddy system which overcomes the foregoing disadvantages of the conventional apparatus. This service pole caddy system was designed to provide a convenient means to store, assemble and disassemble service poles and to provide an auxiliary platform to perform the underwater work. In addition, the system provides a standard set of poles to perform most of the tasks and eliminates many of the problems historically experienced by servicing crews.

In accordance with the preferred embodiment of the invention, the service pole caddy system comprises a rail truck-mounted rigid frame which supports a pole storage caddy, a set of standard service poles, a pole assembly work station and a motorized monorail pole hoist. A detachable auxiliary personnel work platform can be mounted on the rigid frame adjacent to the pole assembly work station. The hoist is used to convey the pole sections back and forth from the storage caddy to the work station for assembly and disassembly as required. The hoist is also used to support the weight of the pole assembly for in-vessel work. The entire rigid frame can be rolled along the refueling bridge to a desired location.

The service pole caddy system provides a convenient vertical storage rack for storing service poles away from other servicing activities. The stored poles are easily accessible for assembly. Since the rack is positioned over the pool of coolant inside the reactor cavity, any excess water on the poles drains back into the pool, thereby keeping contaminated liquids off of the refueling bridge. Also, storing the service poles in a dedicated rack hanging off of the refueling bridge avoids the undesirable condition wherein the work area on the bridge walkway becomes cluttered with service poles.

The service pole caddy system further comprises a passive pole support and assembly work station having means adapted to couple with a neck on a pole end connector of each of the service poles. In particular, these means comprise a two-position slotted keyway plate. A first position allows the pole to be lowered by the hoist until the next pole connector is lined up in the keyway. The operator then manually pushes the pole into a second position where the neck of the pole can be rested on a tapered support seat. The operator then causes the hoist to slacken, thereby transferring the load of the multi-pole assembly to the keyway plate, and removes the pole handling connector. The next pole is then removed from the caddy and connected to the pole supported by the keyway plate of the assembly station. Without disengaging the hoist from the last-assembled pole, the operator raises the multi-pole assembly to take the load off the keyway plate, pushes the multi-pole assembly until the pole intersecting the keyway is aligned in the first position. The operator then lowers the multi-pole assembly until the neck of the last-assembled (i.e., top) pole is lined up with the keyway and pushes the last-assembled pole into the support (i.e., second) position. This process is repeated until the pole assembly is complete. This feature eliminates the need for any mechanical latches, collars, or clamp devices. The pole assembly cannot be easily dropped, since it is either hooked to the hoist or supported in the assembly station keyway.

The pole assembly work station on the service pole caddy system has a guided keyway feature to provide lateral restraint during torquing operations. The pole is vertically located in the guided keyway such that the full body diameter of the pole is within the key. The pole is thus prevented from moving laterally, allowing one-man torquing capability without the use of a T-bar.

The service pole caddy system features a detachable auxiliary personnel platform. When used, the platform allows workers to position themselves adjacent to and/or across from each other when performing underwater work. Less congestion and more working room allows more efficient performance with less visual interference around the work area.

DETAILED DESCRIPTION OF THE PREFERRED EMBODIMENTS

Figure 1:
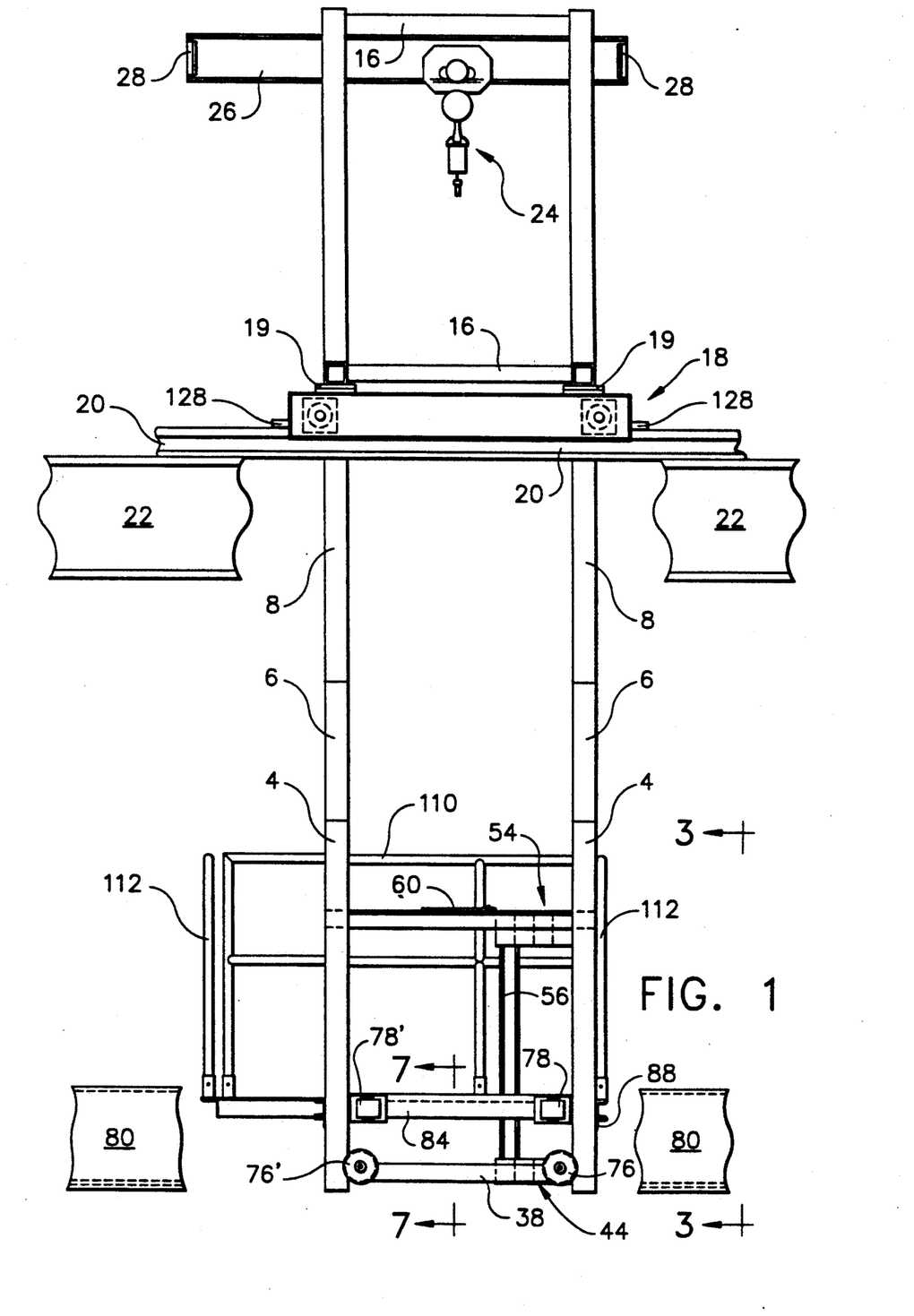
FIGS. 1 and 2 are front and side views, respectively, of the service pole caddy system in accordance with a preferred embodiment of the invention.
Figure 2:
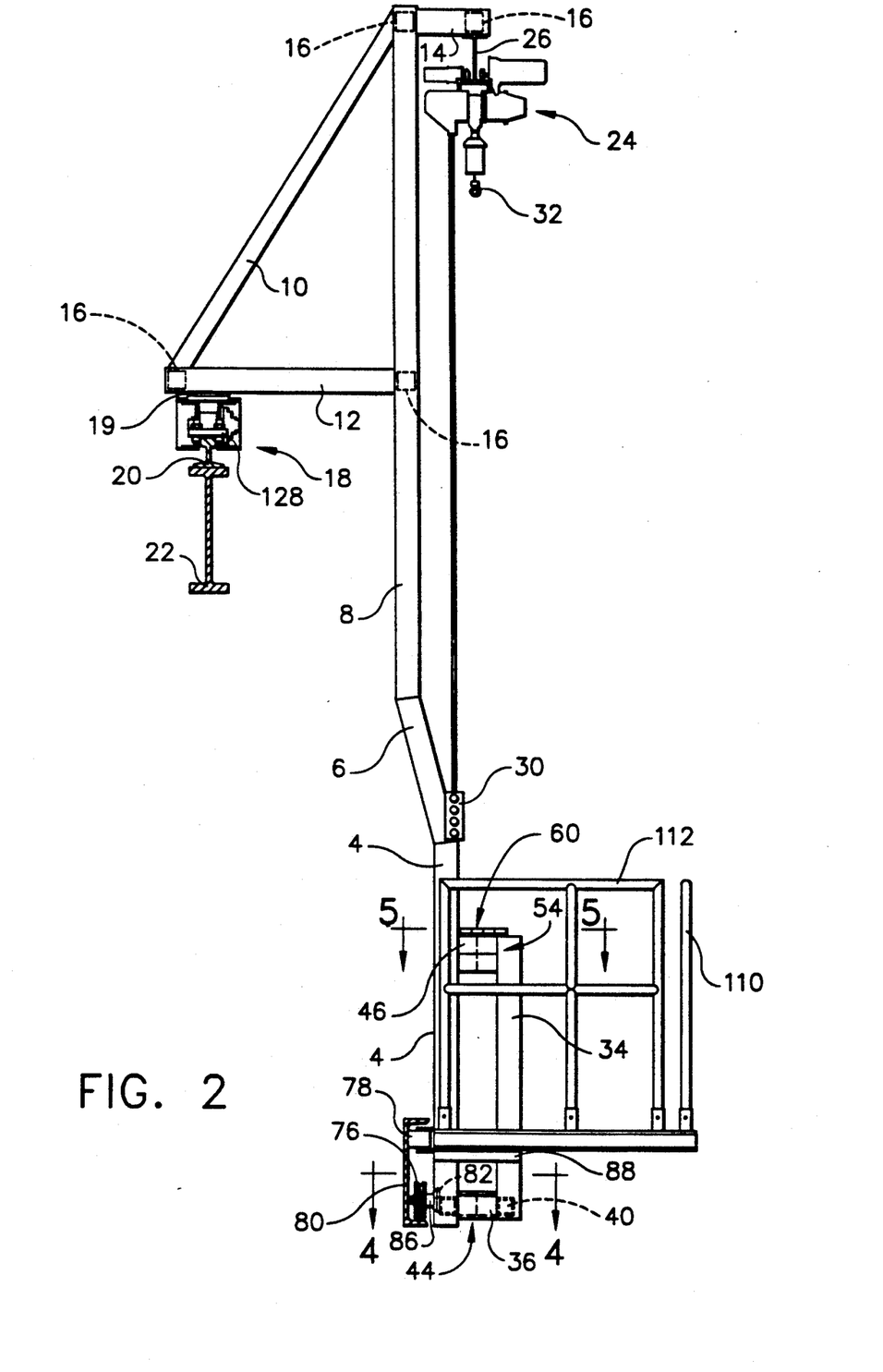

Referring to FIGS. 1 and 2, the service pole caddy system 2 in accordance with the preferred embodiment of the invention comprises a rigid frame made up of welded tubes. The rigid frame comprises right and left frames, each comprising a vertical tube 4, an oblique tube 6, a vertical tube 8, an oblique tube 10, a horizontal tube 12 and a horizontal tube 14. The right and left frames are connected by four horizontal tubes 16. The rigid frame is mounted on a truck 18 via plate 19. Truck 18 rides on a rail 20 which is supported by an I-beam 22 of the refueling bridge, as shown in FIG. 2.

A monorail hoist 24 has a motorized trolley which rides on an I-beam 26 supported by the rigid frame. The travel of hoist 24 is stopped at the ends of I-beam 26 by respective stop angles 28. The maximum travel of the hoist may be about 46 feet or any other length depending on the dimensions of the specific reactor with which the pole caddy system is used. The hoist 24 includes a control box 30 and a hook 32 which is coupled to a pole connector to be described in detail below.

Figure 3:
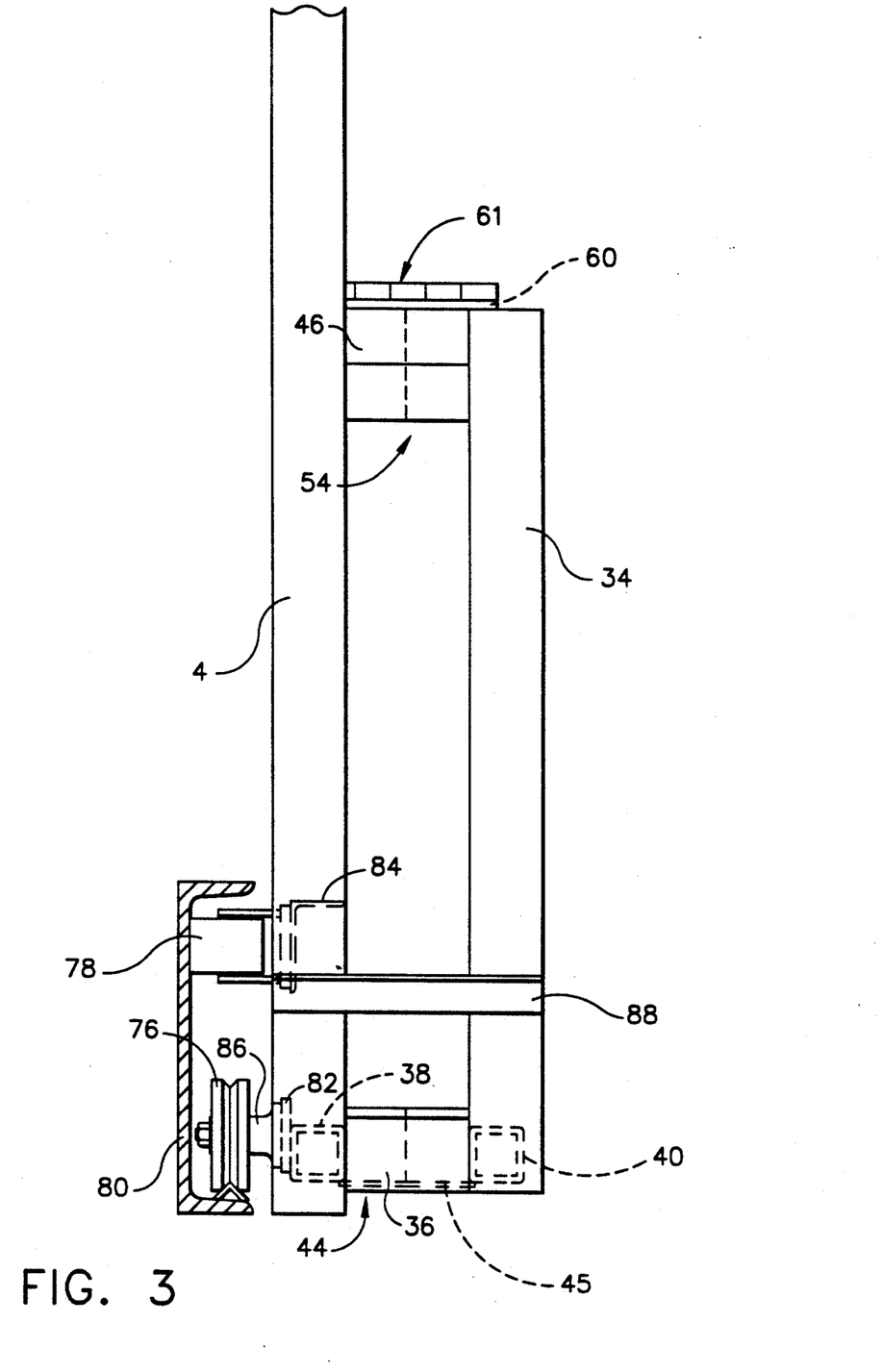
FIGS. 3 and 7 are sectional views respectively taken along Sections 3—3 and 7—7 shown in FIG. 1.
Figure 4:
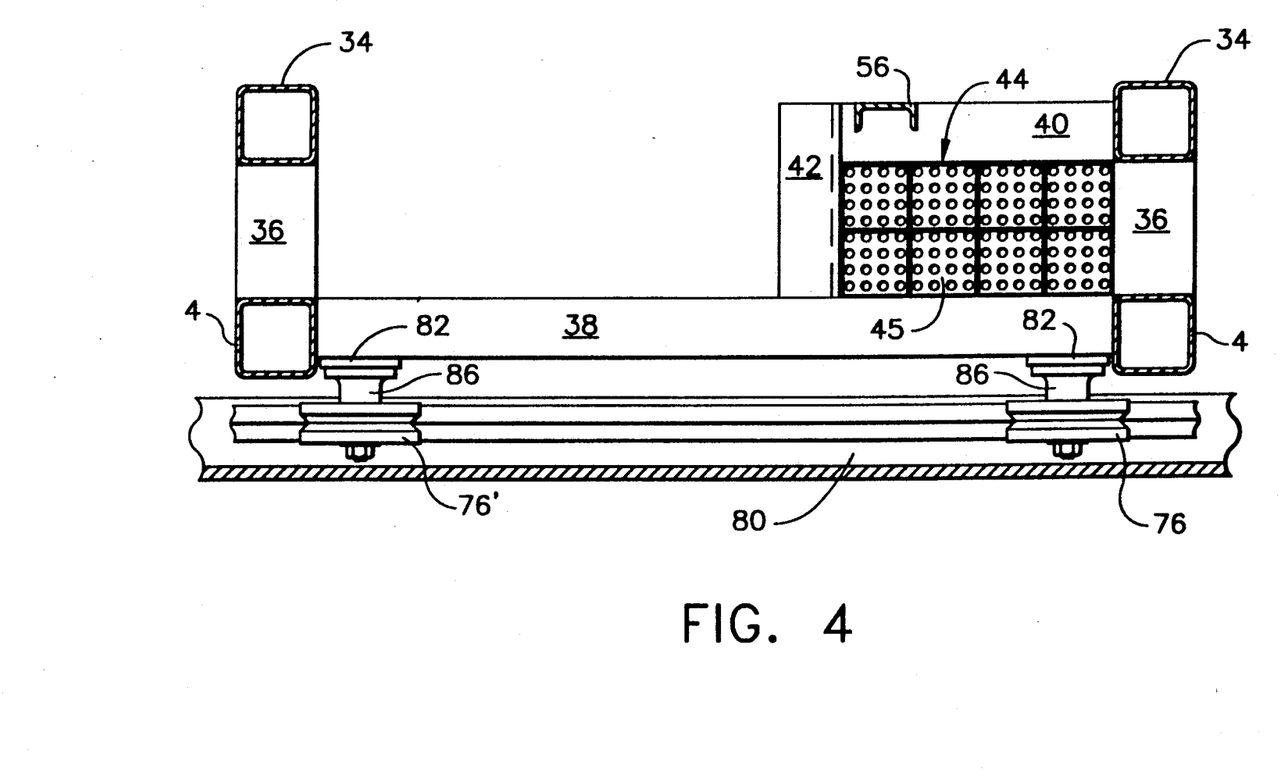
FIGS. 4 and 5 are sectional views respectively taken along Sections 4—4 and 5—5 shown in FIG. 2.
Figure 5:
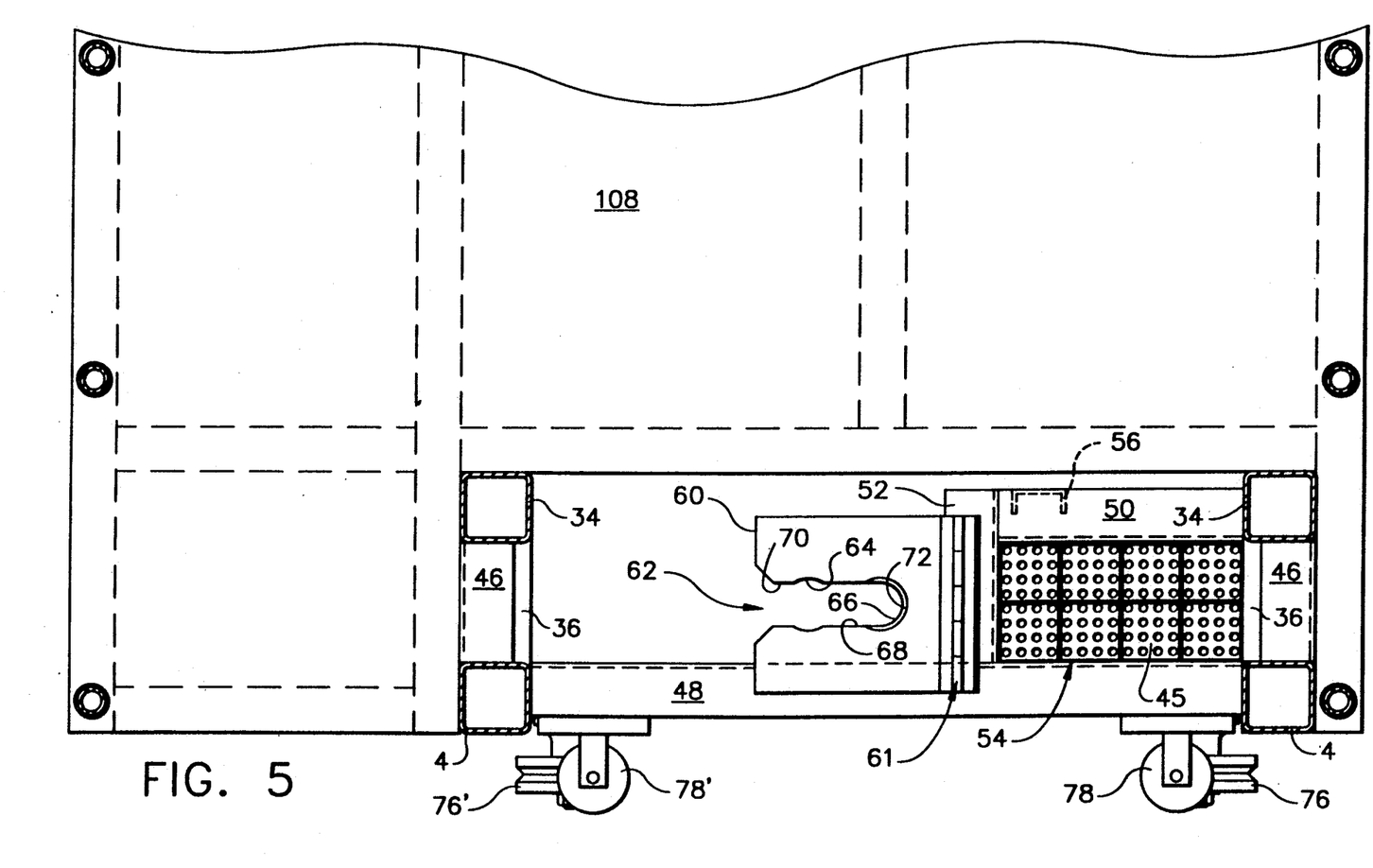

As best seen in FIGS. 3 through 5, the rigid frame further comprises a rigid structure welded to tubes 4 for supporting the pole service caddy. This structure includes two vertical tubes 34 separated by a distance equal to the distance between tubes 4; two horizontal tubes 36 each welded at respective ends to a tube 4 and a tube 34; a horizontal tube 38 welded at respective ends to tubes 4; and a horizontal tube 40 welded to one of the tubes 34 and parallel to horizontal tube 38. Horizontal tubes 38 and 40 are in turn joined by an angle 42.

As shown in FIG. 4, a lower rack 44 is welded into the rectangular space defined by tubes 36, 38, 40 and angle 42. Lower rack 44 is a four-by-two array of tubular cells of square cross section, each tubular cell being designed to receive one end of a generally upright service pole. Lower rack 44 has a perforated plate 45 (see FIG. 3) at the bottom which supports the ends of the service poles while allowing water from the poles to drain through and into the pool below.

As shown in FIG. 5, the rigid structure further includes two horizontal angles 46 each welded at respective ends to a tube 4 and a tube 34; a horizontal angle 48 welded at respective ends to tubes 4; and a horizontal angle 50 welded to one of the tubes 34 and disposed parallel to angle 48. Horizontal angles 48 and 50 are in turn joined by an angle 52.

Figure 6:
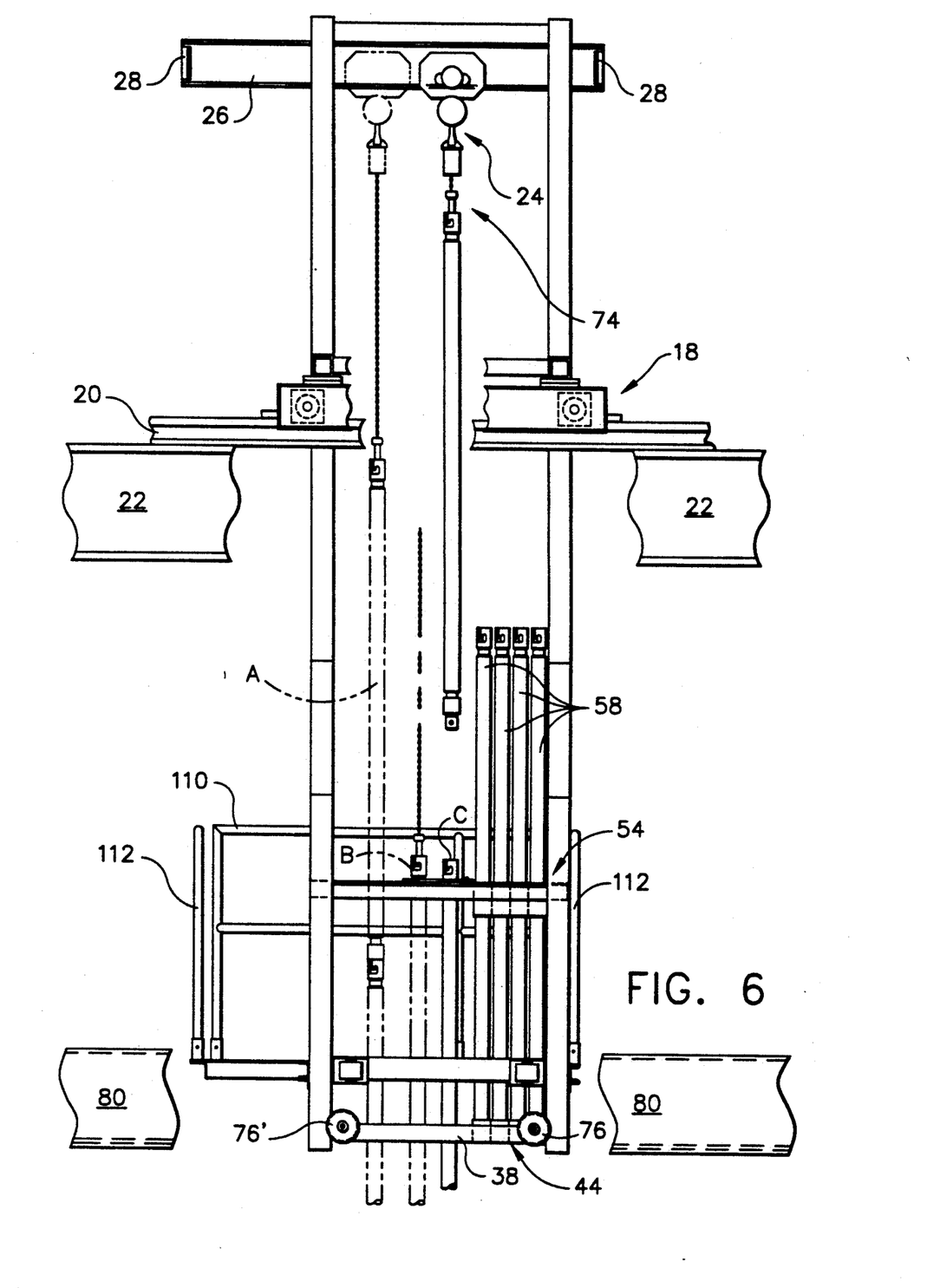
FIG. 6 is a front view showing the positions of a service pole relative to the service pole caddy system during storage, assembly and tool manipulation.

An upper rack 54 is welded into the rectangular space defined by angles 46, 48, 50 and 52. Upper rack 54, like lower rack 44, is a four-by-two array of tubular cells of square cross section, each tubular cell being designed to receive a mid-portion of a generally upright service pole. The upper rack is supported by a channel member 56, which is welded to tube 40 at the lower end and to angle 50 at the upper end. The lower and upper racks are positioned in alignment at different elevations and together maintain the service poles 58 in a generally vertical storage position, one pole to a cell, as shown in FIG. 6. In an exemplary embodiment, each cell has a width of $3\frac{1}{4}$ inches, whereas each pole has an outer diameter of $2\frac{1}{2}$ inches, allowing for easy storage and removal.

The frame shown in FIG. 5 further comprises a keyway plate 60, which is swingably mounted on a hinge 61 welded to angles 48 and 52. In the down position, keyway plate 60 has a portion which rests atop angle 48 and is supported thereby. Keyway plate 60 has a two-position slot 62 with two throats 68, 70 of width less than the outer diameter of the service poles, but greater than the diameter of the neck of the pole end connector (to be described in detail below).

At a first position, slot 62 has opposing recesses 64 which are arcs of a circle of radius $1\frac{1}{2}$ inches. The tubing of a service pole intersecting the slot 62 and positioned between recesses 64 cannot be displaced laterally except for a small amount of play. This play allows for guided vertical displacement of the pole when in position B shown in FIG. 6.

The slot 62 ends at a second position in a semicircle 66 of diameter $2\frac{5}{8}$ inches, which is slightly greater than the pole neck diameter but less than the pole outer diameter. The upper edge of slot 62 at the second position is chamfered to form a seat 72 which supports a service pole in position C shown in FIG. 6.

As best seen in FIG. 6, the service poles 58 are lifted, lowered and carried by means of hoist 24, which is an electric hoist with a motorized trolley that rides on monorail 26. The hoist has a coupling 74 adapted to couple with the end connector of a service pole. A service pole 58 can be lifted out of the storage caddy, carried laterally and then lowered into guided pole handling position B. A pole in position B can be moved into pole assembly position C by first displacing the pole vertically while in position B until its neck is lined up with slot 62 and then pushing the pole so that its neck passes through throat 68. When the pole overlies position C (see FIG. 6), the pole is lowered until its seating portion abuts and is supported by support seat 72. Then another pole can be retrieved from the caddy and placed directly over the pole being supported in position C. Thereafter the bottom end connector of the second pole is coupled to and locked on the top end connector of the pole being supported in position C.

This operation is repeated until the multi-pole assembly is completed.

The multi-pole assembly can then be carried by the hoist to open pole handling position A and lowered as necessary to line up the tool, mounted on the lower end of the assembly, with the component to be manipulated by the tool.

Figure 9A:
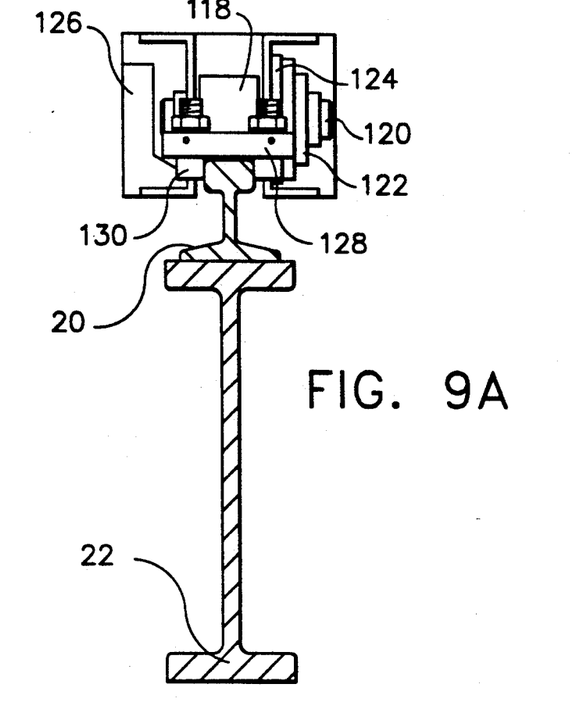
FIGS. 9A and 9B are end and sectional views respectively of the service pole trolley incorporated in the preferred embodiment of the invention.
Figure 9B:
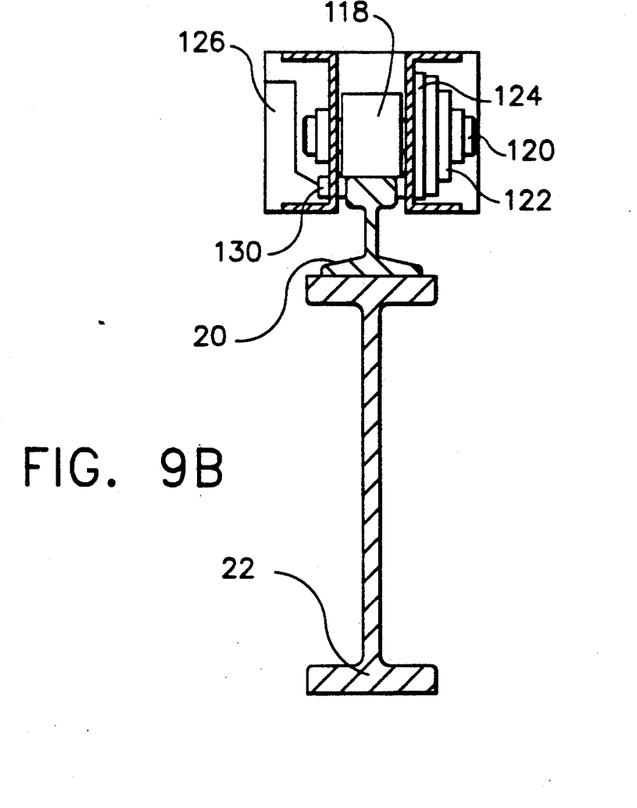

The service pole position is also determined by the position of the movable rigid frame. As previously described, the rigid frame is mounted on truck 18, which rides on rail 20 supported by I-beam 22 of the refueling bridge. Some of the components of truck 18 are shown in FIGS. 9A and 9B. The truck has two wheels 118 mounted on respective shafts 120. Other truck components include four bearings 122, four spacers 124, four hold-down plates 126, two rubber wiper rails 128 and four cam followers 130.

Figure 7:
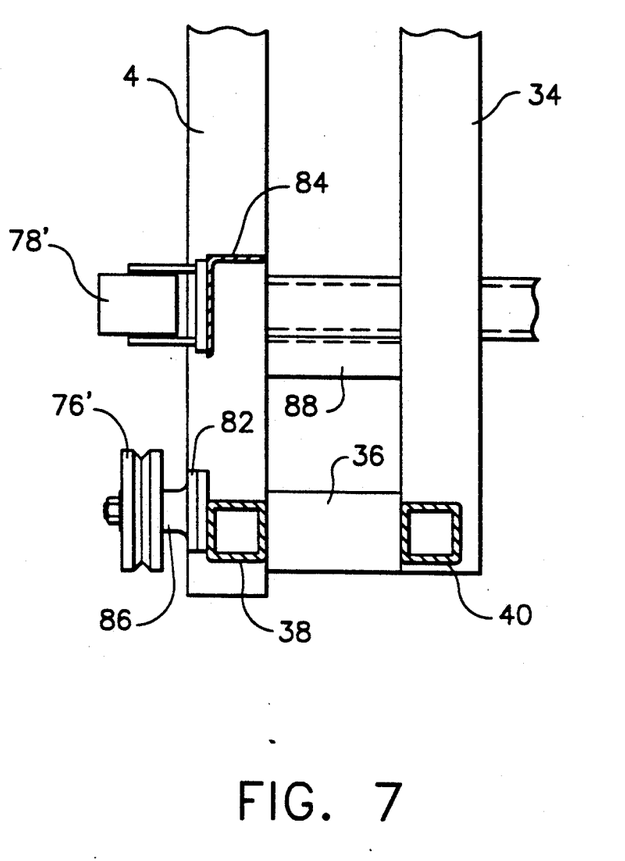

The rigid frame, in addition to riding on a rail supported by the refueling bridge I-beam, is also provided with a pair of wheels 76, 76' and a pair of casters 78, 78' (see FIG. 1). As best seen in FIG. 2, wheels 76 and 76' ride on a lower leg of a refueling bridge channel 80, while casters 78, 78' bear against the vertical central member of channel 80. The casters 78, 78' are supported by wheel support 84, which is an angle welded to vertical tubes 4 (see FIGS. 1 and 7). The wheels 76, 76' are supported by brackets 82 via hubs 86 (see FIG. 7). Brackets 82 are welded to horizontal tube 38.

Figure 8:
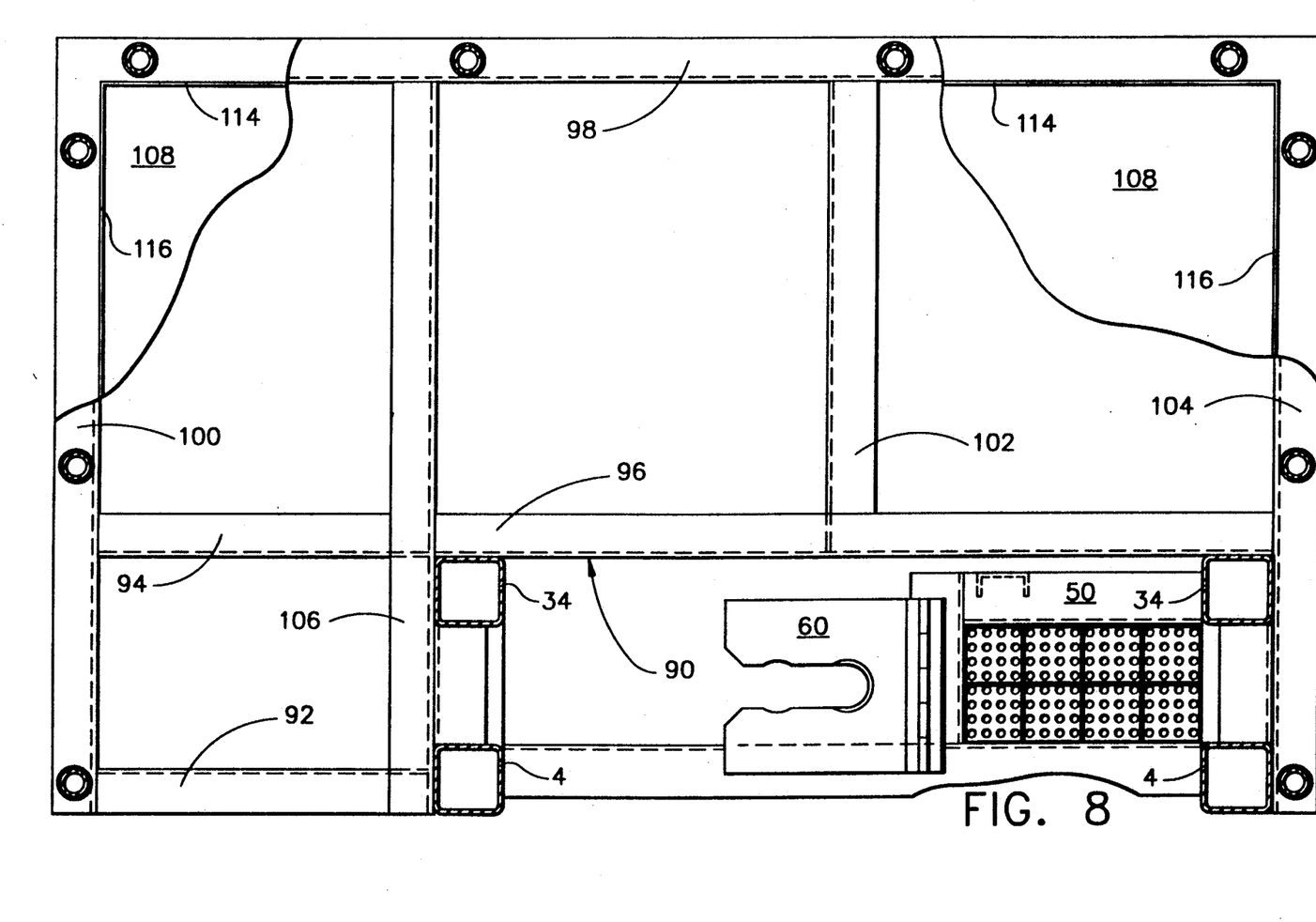
FIG. 8 is a top view of the detachable auxiliary work platform incorporated in the preferred embodiment of the invention.

Referring to FIG. 3, the frame further comprises two supporting angles 88, each supporting angle being welded to a vertical tube 4 and a vertical tube 34. Angles 88 support the auxiliary personnel work platform, which is generally designated by numeral 90 in FIG. 8.

The work platform 90 is generally L-shaped, the two legs of the L being situated adjacent two sides of the pole storage station. The work platform has a welded base frame comprising angles 92, 94, 96, 98, 100, 102 and channels 104, 106. This base frame has a floor plate 108 welded thereon, on which the personnel stand. The perimeter of the work platform has a front railing 110 and two side railings 112, as best seen in FIG. 1. The perimeter of the base frame has a front kick plate 114 and two side kick plates 116 (see FIG. 8).

Tubes 4, 6, 8, 34 and 36 are preferably 4"×4"×⅛"; tubes 12 and 14 are preferably 4"×4"×¼"; and tubes 10, 16, 38 and 40 are preferably 3"×3"×¼". All tubes can be made of ASTM A500 steel or any other functionally equivalent material. All angles referred to hereinabove are preferably 3"×3"×¼" and can be made of ASTM A36 steel.

The service poles used with the service pole caddy system of the invention have a diameter which is larger than that of conventional service poles. These large-diameter poles are designed to transmit torques adequate for all expected operations. The end connectors of these poles have a plug and socket design with a twist pin and a locking collar. This design maximizes the rigidity of the multi-pole assembly. Solid body end connectors are welded to each end of the poles to prevent contaminated water from entering the inside of the poles and to achieve pole buoyancy. Internal pole contamination is prevented and exterior decontamination can be easily accomplished. The solid body of each pole connector provides the equivalent shielding of eight feet of water in a four-pole assembly, thus preventing radiation streaming.

Figure 10:
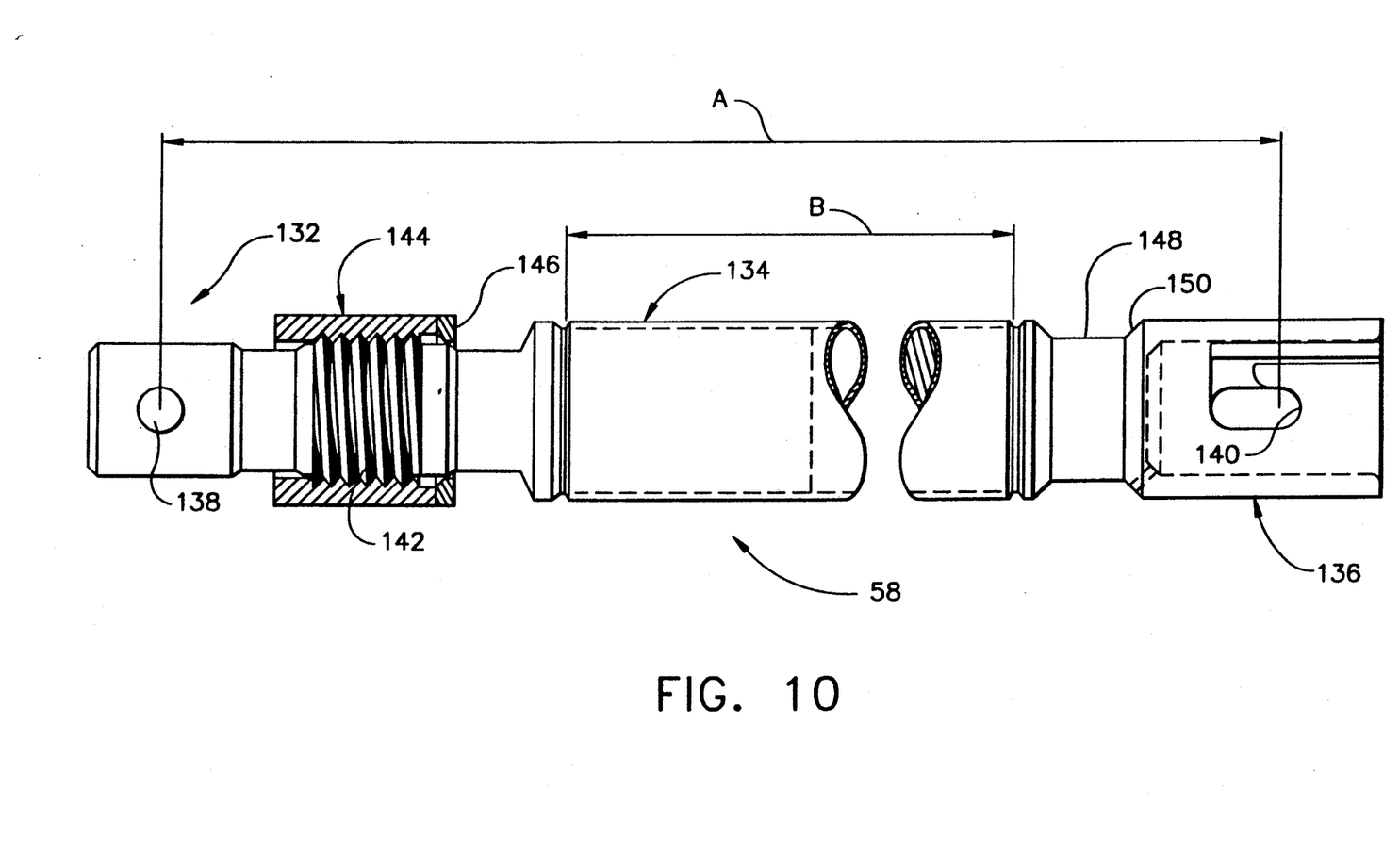
FIG. 10 is a side view of a service pole of the type used with the service pole caddy system of the invention, showing the locking collar in section.

Referring to FIG. 10, each service pole 58 comprises stainless steel tubing 134 with solid body end connectors 132 and 136 welded to respective ends thereof. End connector 132 has a pair of diametrally opposed, radially outwardly extending circular cylindrical twist pins 138 which cooperate with corresponding slots in locking collar 140 formed in end connector 136. The hoist 24 is provided with a coupling having twist pins identical to those on end connector 132 to enable the hoist to couple with the end connector 136 of any service pole which needs to be hoisted.

Each end connector 132 is provided with threads 142. When threaded coupling 144 is screwed onto threads 142 of an end connector 132 coupled to an end connector 136, the connectors are effectively locked together. The pieces of the split ring are then attached to coupling 144, thereby preventing the coupling from being accidently screwed off and dropped into the reactor.

Each end connector 136 has a neck 148 and a chamfered portion 150. When neck 136 passes through throat 68 of keyway plate 60 (see FIG. 5) to the second position, the pole is lowered until chamfered portion 150 rests on support seat 72, whereby the keyway plate supports the service pole, as indicated at position C in FIG. 6. The chamfered portion 150 form-fits with the chamfered support seat 72 such that lateral displacement of the chamfered portion 150 of the service pole seated thereon is resisted.

The service poles can be of two different sizes. For example, one set of poles could have dimensions A and B (see FIG. 10) of 48 and 38⅝ inches respectively, while another set of poles could have dimensions A and B of 96 and 86⅝ inches respectively. The stainless steel tubing 134 has an outer diameter of 2½ inches and a wall thickness of 0.083 inch.

The preferred embodiment has been described for the purpose of illustration only. Various modifications of the service pole caddy system in accordance with the invention will be apparent to a skilled engineer. For example, the service pole caddy system disclosed herein can be readily adapted to cooperate with a refueling bridge having supporting structure different than that disclosed herein.

I claim:

1. A service pole caddy system for servicing a nuclear reactor using a plurality of service poles which can be coupled in series to form a multi-pole assembly having an end adapted for carrying a tool, comprising:

track support means mounted on said nuclear reactor;
track means supported by said track support means, said track means extending over said nuclear reactor in a generally horizontal plane;
rolling means arranged to roll along said track means between first and second positions;
pole storage means for supporting a plurality of service poles in a generally upright position;
pole assembly means for hanging a multipole assembly thereon; and
rigid frame means for rigidly coupling said pole support means and said pole assembly means, said rigid frame means riding on said rolling means.

2. The service pole caddy system as defined in claim 1, wherein said pole support means comprises first and second racks which are substantially vertically aligned at first and second elevations respectively, each of said first and second racks comprising a plurality of cells arrayed such that each cell of said first rack overlies a corresponding cell of said second rack, each cell of said first rack having means for blocking lateral displacement of a first portion of a corresponding service pole placed therein and each corresponding cell of said second rack having means for blocking lateral displacement relative thereto of a second portion of said corresponding service pole, and further comprises means for blocking downward displacement of a bottom end of said service pole when inserted in said racks in a generally upright position.

3. The service pole caddy system as defined in claim 2, wherein said downward displacement blocking means comprises a perforated plate.

4. The service pole caddy system as defined in claim 1, wherein said track support means comprises a refueling bridge spanning said nuclear reactor.

5. The service pole caddy system as defined in claim 1, wherein each of said service poles comprises a neck portion and a seating portion, said seating portion being joined to said neck portion and having a diameter greater than a diameter of said neck portion, and said pole assembly means comprises a keyway plate having a slot with a pole seat for receiving said neck portion and supporting said seating portion of said service pole, said pole seat being shaped to form-fit with said seating portion to prevent lateral displacement of said seating portion of said service pole seated thereon.

6. The service pole caddy system as defined in claim 5, wherein each of said service poles comprises first and second solid-body end connectors joined to respective first and second ends of a tube having a diameter which is greater than said diameter of said neck portion, said neck portion being formed in said first end connector, and said slot further comprises guide means for blocking substantial lateral displacement of a portion of said tube of said service pole when inserted within said guide means, with sufficient play therebetween to allow said service pole to be vertically displaced without impediment.

7. The service pole caddy system as defined in claim 6, wherein said guide means communicates with said pole seat by way of throat means having a width greater than said diameter of said neck portion and less than said tube diameter.

8. The service pole caddy system as defined in claim 1, wherein each of said service poles comprises first and second solid-body end connectors joined to respective first and second ends of a tube having a predetermined diameter, and said pole assembly means comprises guide means for blocking substantial lateral displacement of a portion of said tube when inserted within said guide means, with sufficient play therebetween to allow said service pole to be vertically displaced without impediment.

9. The service pole caddy system as defined in claim 1, further comprising a horizontal platform attached to said rigid frame means for supporting work personnel thereon.

10. The service pole caddy system as defined in claim 5, wherein said keyway plate is rotatably coupled to said rigid frame means.

11. A service pole caddy system for servicing a nuclear reactor using a plurality of service poles which can be coupled in series to form a multi-pole assembly having an end adapted for carrying a tool, comprising:
   track support means mounted on said nuclear reactor;
   track means supported by said track support means, said track means extending over said nuclear reactor in a generally horizontal plane;
   rolling means arranged to roll along said track means between first and second positions;
   pole storage means for supporting a plurality of service poles in a generally upright position;
   pole assembly means for hanging a multipole assembly thereon;
   a horizontal platform for supporting work personnel thereon; and
   rigid frame means for rigidly coupling said pole support means, said pole assembly means and said horizontal platform to each other, said rigid frame means riding on said rolling means.

12. The service pole caddy system as defined in claim 11, wherein said pole support means comprises first and second racks which are substantially vertically aligned at first and second elevations respectively, each of said first and second racks comprising a plurality of cells arrayed such that each cell of said first rack overlies a corresponding cell of said second rack, each cell of said first rack having means for blocking lateral displacement of a first portion of a corresponding service pole placed therein and each corresponding cell of said second rack having means for blocking lateral displacement relative thereto of a second portion of said corresponding service pole, and further comprises means for blocking downward displacement of a bottom end of said service pole when inserted in said racks in a generally upright position.

13. The service pole caddy system as defined in claim 11, wherein said downward displacement blocking means comprises a perforated plate.

14. The service pole caddy system as defined in claim 11, wherein said track support means comprises a refueling bridge spanning said nuclear reactor.

15. The service pole caddy system as defined in claim 11, wherein each of said service poles comprises a neck portion and a seating portion, said seating portion being joined to said neck portion and having a diameter greater than a diameter of said neck portion, and said pole assembly means comprises a keyway plate having a slot with a pole seat for receiving said neck portion and supporting said seating portion of said service pole, said pole seat being shaped to form-fit with said seating portion to prevent lateral displacement of said seating portion of said service pole seated thereon.

16. The service pole caddy system as defined in claim 15, wherein each of said service poles comprises first and second solid-body end connectors joined to respective first and second ends of a tube having a diameter which is greater than said diameter of said neck portion, said neck portion being formed in said first end connector, and said slot further comprises guide means for blocking substantial lateral displacement of a portion of said tube of said service pole when inserted within said guide means, with sufficient play therebetween to allow said service pole to be vertically displaced without impediment.

17. The service pole caddy system as defined in claim 16, wherein said guide means communicates with said pole seat by way of throat means having a width greater than said diameter of said neck portion and less than said tube diameter.

18. A service pole caddy system for servicing a nuclear reactor using a plurality of service poles which can be coupled in series to form a multi-pole assembly having a lower end adapted for carrying a tool, each of said service poles having a neck portion of first diameter and a seating portion of second diameter greater than said first diameter, said seating portion being joined to said neck portion, comprising:

pole assembly means for holding a first service pole generally upright at an assembly position during connection of a bottom end of a second service pole to a top end of said first service pole; and rigid support means for supporting said pole assembly means in a position over said nuclear reactor, wherein said pole assembly means comprises a keyway plate having a slot with a pole seat at said assembly position for receiving said neck portion and supporting said seating portion of said first service pole, each of said service poles comprises first and second solid-body end connectors joined to respective first and second ends of a tube having a third diameter which is greater than said first diameter of said neck portion, said neck portion being formed in said first end connector, and said slot further comprises guide means for blocking substantial lateral displacement of a portion of said tube of said service pole when inserted within said guide means, with sufficient play therebetween to allow said first service pole to be vertically displaced without impediment, said guide means communicating with said pole seat by way of a throat having a width greater than said first diameter of said neck portion and less than said third diameter of said tube.

19. A service pole caddy system for servicing a nuclear reactor using a plurality of service poles which can be coupled in series to form a multi-pole assembly having a lower end adapted for carrying a tool, each of said service poles having a neck portion of first diameter and a seating portion of second diameter greater than said first diameter, said seating portion being joined to said neck portion, comprising:

pole assembly means for holding a first service pole generally upright at an assembly position during connection of a bottom end of a second service pole to a top end of said first service pole; and rigid support means for supporting said pole assembly means in a position over said nuclear reactor, wherein said pole assembly means comprises a keyway plate having a slot with a pole seat at said assembly position for receiving said neck portion and supporting said seating portion of said first service pole, said pole seat comprising an arc-shaped chamfered surface having a radius greater than the radius of said neck portion of said first service pole, and said seating portion on said first service pole comprising a circular chamfered surface which abuts said arc-shaped chamfered surface in a form-fitting relationship when said first service pole is supported by said keyway plate at said assembly position.

* * * * *